US008464694B2

(12) United States Patent
Gurin et al.

(10) Patent No.: US 8,464,694 B2
(45) Date of Patent: Jun. 18, 2013

(54) METHOD AND SYSTEM FOR PROVIDING FUEL TO INTERNAL COMBUSTION ENGINES

(75) Inventors: Victor Gurin, Hallandale, FL (US); Igor Gachik, Boca Raton, FL (US); Serguei Permiakov, Kanata (CA); Roman Press, Pittsford, NY (US); Leonid Faynberg, Davie, FL (US); Aleksandr Reshetnyak, Hollywood, FL (US)

(73) Assignee: Fuecotech, Inc., Hollywood, FL (US)

( * ) Notice: Subject to any disclaimer, the term of this patent is extended or adjusted under 35 U.S.C. 154(b) by 536 days.

(21) Appl. No.: 12/798,513

(22) Filed: Apr. 6, 2010

(65) Prior Publication Data

US 2010/0268443 A1 Oct. 21, 2010

Related U.S. Application Data

(60) Provisional application No. 61/212,671, filed on Apr. 15, 2009.

(51) Int. Cl.
*F02M 21/02* (2006.01)

(52) U.S. Cl.
USPC ............... 123/525; 123/1 A; 123/3; 123/531; 123/575; 701/103

(58) Field of Classification Search
USPC ........ 123/1 A, 2, 3, 531, 575, 27 GE; 60/281; 239/102.1
See application file for complete search history.

(56) References Cited

U.S. PATENT DOCUMENTS

| | | | | |
|---|---|---|---|---|
| 4,040,403 A | * | 8/1977 | Rose et al. | 123/522 |
| 4,161,164 A | * | 7/1979 | Muhlberg | 123/551 |
| 4,376,423 A | * | 3/1983 | Knapstein | 123/1 A |
| 4,596,210 A | * | 6/1986 | Schmidtke | 123/1 A |
| 5,293,857 A | * | 3/1994 | Meyer | 123/568.18 |
| 5,836,290 A | * | 11/1998 | Gilbert | 123/522 |
| 6,273,072 B1 | | 8/2001 | Knapstein | |
| 7,011,048 B2 | | 3/2006 | Gurin | |
| 7,261,094 B2 | * | 8/2007 | Gurin | 123/531 |
| 7,406,955 B1 | | 8/2008 | Gachik | |
| 7,523,747 B2 | | 4/2009 | Gachik | |
| 7,770,545 B2 | * | 8/2010 | Morgenstern | 123/3 |
| 7,789,047 B2 | * | 9/2010 | Kuroki et al. | 123/3 |
| 2004/0255873 A1 | * | 12/2004 | Cueman et al. | 123/1 A |
| 2008/0223344 A1 | * | 9/2008 | Suzuki et al. | 123/525 |

\* cited by examiner

*Primary Examiner* — Noah Kamen
*Assistant Examiner* — Grant Moubry
(74) *Attorney, Agent, or Firm* — Hershkovitz & Associates, PLLC; Abraham Hershkovitz

(57) ABSTRACT

The present invention relates to a system and method for providing fuel to internal combustion engines including fuel activation prior to injection. The method carried out by the system comprises dissolving a mixture of gasses providing improved fuel dispersing after fuel injection into a combustion chamber. Dissolved gasses desorption is stimulated from a unsaturated fuel solution. Full control of fuel flows with dissolved gas/gasses to and from injectors and FET technology is based on Henry's law (dissolving gasses in the liquids) and Kelvin principle (vapor pressure over droplet surface). The system provides fuel to internal combustion engines and consists of compact components, including exhaust gasses recirculation system which can be easily added to existing diesel and gasoline engine fuel supply systems. The method and system were tested with 4 different types of engines. The new method can use any type of liquid fuel—petroleum or synthesized, and provides fuel economy in 12-20% decrease of emissions and up to 25% at variable engine loads and significantly at engine cold start.

13 Claims, 3 Drawing Sheets

METHOD AND SYSTEM FOR PROVIDING FUEL TO INTERNAL COMBUSTION ENGINES

FIELD OF INVENTION

The present invention relates to liquid fuel combustion and, more particularly, to the preparation of liquid fuels for combustion in a combustion chamber of internal combustion engines.

THE BACKGROUND OF THE INVENTION

In existing internal combustion engines such as diesel and gasoline engines, as well as other types of engines a fuel is injected into a combustion chamber at high pressure. A charge of the fuel is injected by means of solenoid injectors controlled by an on-board microcomputer and connected to a common rail. The on-board microcomputer controls injection timing and duration as well as an injection pressure by means of a two-stage main fuel pump. To provide better fuel atomization after injection into combustion chamber the fuel pressure in the common rail upstream the injectors is maintained at high level, e.g., in diesel engines the fuel pressure is maintained at 2000-2400 bars.

Currently different approaches are used to improve the fuel atomization and dispersion in the combustion chamber after injection. For example, joint injection of hydrogen or natural gas with gasoline is used, in other systems a compressed air stream is directed to the fuel spray injected into the combustion chamber. There is also an approach where fuel and air are induced with the same charge to reduce coalescence of the fuel microdroplets after the injection.

There are known attempts to disperse fuel by dissolving some gas, e.g., air or carbon dioxide, in the liquid fuel and subsequently injecting this solution into the combustion chamber. When injected into the combustion chamber the dissolved gas is released from the solution providing very fine dispersion of the liquid fuel. In U.S. Pat. No. 6,273,072 (Knapstein et al.) and U.S. Pat. No. 7,011,048 (Gurin et al.), there are described methods and devices for implementation and utilization of the above-mentioned effect. The described systems require special devices that are supposed to work within a certain range of parameters and at the same time certain conditions should be observed to provide the fuel/gas solution to the combustion chamber in proper condition. In practice it is difficult to satisfy both of these requirements simultaneously, and the achieved effect is not stable at various loads.

SUMMARY OF THE INVENTION

An object of this invention is to provide a method and apparatus which overcomes the abovementioned disadvantages and which provides for further improvement in the fuel injection into the combustion chamber that reduces fuel consumption as well as emissions.

In accordance with invention there are provided technical solutions for different types of fuel systems. The fuel is prepared for injection and combustion in a special device, an absorber, where the fuel is contacted with the gas or gasses. The gas pressure inside the absorber is maintained higher than the fuel pressure supplied to the absorber; the gas is dissolved in the liquid fuel forming an unsaturated fuel solution having no free gas phase. The resultant fuel solution is guided to a main fuel pump that further increases the pressure of the fuel solution providing no free gas phase. Upon injection in the combustion chamber in addition to the hydrodynamic fuel atomization a violent degassing takes place providing continuous chain breaking of fuel microdroplet to fine "nano" sizes. The combination of the gas desorption from the fuel solution with the hydrodynamic breaking-up of the injected fuel provides a fundamentally new process of the fuel atomization in the combustion chamber. The fuel microdroplets continuously break up to significantly small sizes providing an extremely high interfacial curvature and liquid vapor (fuel) pressure increases by as much as 8-10 times. This effect is described by the Kelvin equation and it is well known that the quicker liquid fuel evaporates the more rapid and effective the combustion of the gasoline or diesel is. One more important additional effect of the new injection process: the continuous chain breaking of the fuel droplets caused by the gas desorption prevents coalescence of the droplets and formation of a fuel film on the walls of the combustion chamber. As a result more fuel surface is available for contact with air. Thus the fuel burns faster and more completely giving less harmful emissions.

Taking into account this and other objects a method of fuel activation and supplying into the combustion process is presented. The method comprises steps of:

a) Dissolving a gas/mix of gasses in fuel thereby transferring the liquid fuel into a state of unsaturated "fuel/gas" solution without any free gas phase; the fuel is dispersed in the absorber to increase the contact surface with the gas supplied to the absorber at high pressure of up to 100 bar; the process is performed, preferably, at lower temperatures, and gas used for dissolution can be a mixture of, for example, exhaust gases and oxygen enriched air having $O_2$ content of up to 35% and fuel/mixture of gases ratio by weight of 1:0.055. The purpose of using the mixture with increased oxygen content is to increase the local concentration of the oxidant during gas desorption. The presence of locally available oxidant helps more quicker fuel ignition.

b) Activating "fuel/gas" solution by changing the state of the "fuel/gas" solution for a short period of time to a boundary state of oversaturated solution in such way as to minimize or exclude free gas bubbles flashing out of the fuel solution flow at the inlet of the main fuel pump by lowing the pressure of the fuel solution flow or by ultrasound treatment in a hermetic vessel comprising a vibrating element that by ultrafast oscillations forms partial pressure decrease of the fuel solution flowing through the vessel.

c) Merging the recirculation fuel solution flows pumped out after the injection from common rail and main fuel pump, cooling down the fuel solution to 50° C. and guiding it to the absorber to separate free gas/fuel vapor phase.

d) In the fuel system with single stage main fuel pump and distributed injection pumps the return flow is cooled, separated from free gas/fuel vapor phase and guided to the inlet of the main fuel pump. Some fuel after the main fuel pump is guided to a nozzle of a jet pump which is used to pump out free gas/fuel vapor phase from a gas separator and the mix flow then is fed to the absorber to separated liquid and gas phases. This helps to avoid gas or vapor bubbles appearing that may create pressure pulses at the outlet of the main fuel pump and affect the operation of the fuel injectors.

e) Preparing the gas mixture to be used for dissolution in the fuel by cooling and compressing the exhaust gases and mixing it with oxygen enriched air formed by filtering compressed air through a special membrane filter; prepared gas mixture is guided to the absorber for dissolving in the liquid fuel.

With this and other objects in view there is provided, in accordance with the invention, a system for liquid fuel activation and feeding activated liquid fuel to the combustion chamber for combustion, comprising:

a) an absorber for fuel conditioning, having a liquid inlet port for providing a fresh liquid fuel from a fuel tank, a gas inlet port for providing gas or gas mixture, an inlet port for providing returned fuel flows from an engine common rail and main fuel pump, and an outlet port for supplying a fuel solution from the absorber to an engine;

b) a fuel solution activator for momentary transferring the fuel solution to a state of oversaturated solution thereby preparing the fuel solution to a burst gas desorption at injection into the combustion chamber;

c) a fuel supply subsystem for supplying the fresh liquid fuel to the absorber with maintaining fuel level inside the absorber between min and max limits;

d) a subsystem for collecting returned flows from the engine and main fuel pump, separating free gas/fuel vapor, cooling down to 50° C. and guiding the returned flows to the inlet port of the main fuel pump;

e) a control system for controlling the fuel supply and engine operation.

The system and method of operation of the invention with additional objects and advantages thereof will be best understood from the following description of specific embodiments when read in connection with the accompanying drawings.

DETAILED DESCRIPTION OF THE DRAWINGS

Figure 1:
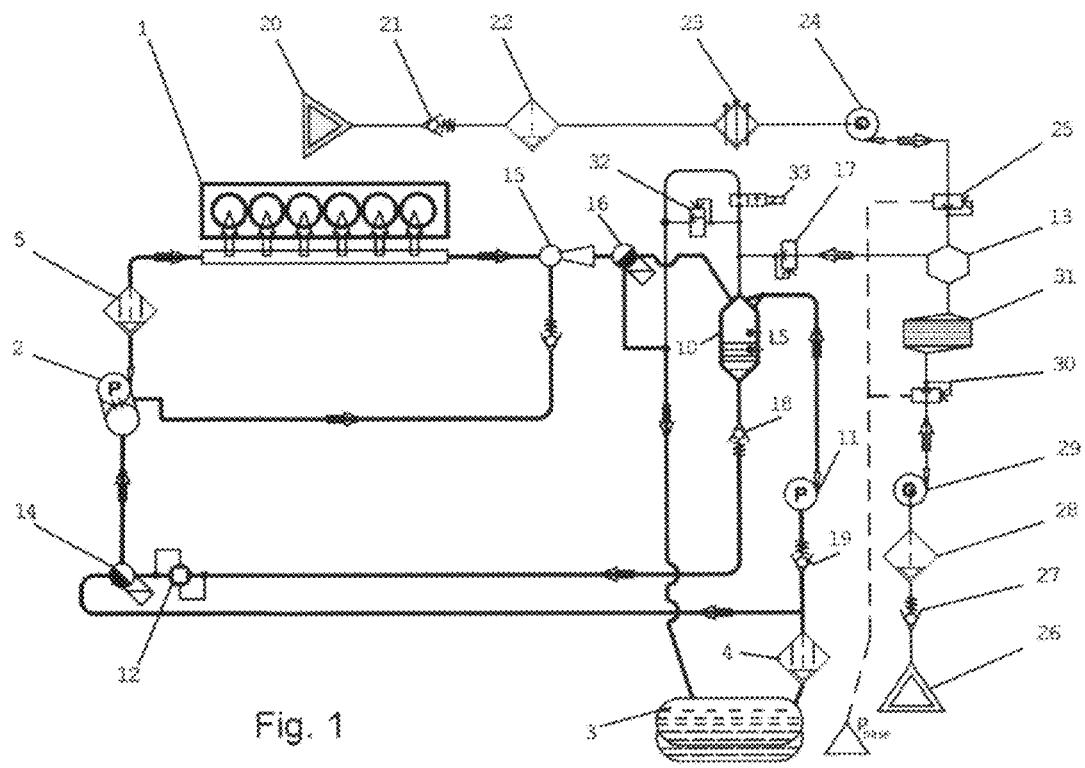
FIG. 1 shows one of the an embodiment of the invention for internal combustion engines having common rail injection system.

FIG. 1 of the drawing shows one of the possible embodiments of the system for an internal combustion engine having common rail injection system. The internal combustion engine can be a standard diesel or gasoline engine. The engine comprises a common rail injection system 1, a two-stage main fuel pump 2, a fuel tank 3, a primary fuel filter 4, a fine fuel filter 5. The common rail injection subsystem comprises unit injectors (not shown) for injecting fuel charge into a cylinder combustion chambers and fluidically connected with the outlet ports of the common rail.

The activation system according to the present invention consists of two subsystems: a conditioning subsystem and a gas preparation subsystem.

The conditioning subsystem comprises an absorber 10, a feeding pump 11, a differential pressure regulator 12, a jet pump 15. Three-way valves 14 and 16 are used to change from standard (base) fuel supply system to the conditioning subsystem and vice versa. Check valves 18, 19 prevent fuel to flow in wrong direction.

The gas preparation subsystem comprises a reactor 13 and two air and exhaust gases supply lines. Air from air source 26 flows through a filter 28, a compressor 29, a pressure regulator 30, and an oxygen enrichment membrane filter 31, a check valve 27 prevents air to flow in wrong direction; exhaust gases from exhaust line of the engine 20 flows through a filter 22, a cooler 23, a compressor 24 and a pressure regulator 25, check valve 21 prevents exhaust gasses to flow in wrong direction.

The gas mixture is prepared in the reactor 13 by mixing the exhaust gases as sources of $CO_2$ with oxygen enriched air that is formed after ambient air passes through the oxygen enrichment membrane filter 31. Mixing of two gas streams in equal portions by weight is provided by pressure regulators 25 and 30 having common control line. Required pressure of the gas mixture is provided by compressors 24 and 29 and controlled by the pressure regulators 25 and 30.

The fuel from fuel tank 3 is delivered by feeding pump 11 to the nozzles mounted in the absorber 10. The feeding pump 11 provides the fuel pressure $P_1$. The gas mixture from the reactor 13 is guided to the gas inlet port of the absorber 10 under gas pressure $P_2$ which is controlled by pressure regulator 17. Pressure regulator 32 maintains the gas pressure inside the absorber 10 at set level $P_2$. The gas pressure $P_2$ is set lower than the fuel pressure $P_1$ providing satisfactory working condition for the fuel dispersing by the nozzle in absorber 10. The dispersing of fuel in gas results in achieving a significant amount of gas being dissolved in fuel. An outlet port located at the bottom of the absorber 10 is fluidically connected to the inlet port of the main fuel pump 2. The differential pressure regulator 12 positioned in the connection line between the absorber 10 and main fuel pump 2 temporarily reduces the fuel solution pressure. The reduced pressure transfers the fuel solution into the boundary state of saturated solution thus facilitating the gas desorption from the fuel by destroying sorption links between liquid and gas molecules. This step improves effectiveness of the desorption process at injection and improves the atomization of the injected fuel charge. In addition the differential pressure regulator 12 compensates for pressure spikes arising during the absorber 10 operation. Instead of differential regulator 12 an ultrasonic magnetostrictive actuator in a hermetical vessel through which a liquid fuel/gas solution flows can be used. Main fuel pump 2 again increases the pressure of the fuel solution as much as 2 times and returns the fuel solution in the state of unsaturated solution. In such state the main fuel pump 2 delivers the fuel solution to the common rail 1 and unit injectors (not shown) for combustion.

It is well known that the gas solubility in liquid is proportional to the partial pressure of the gas over the liquid surface and the concentration of the gas dissolved in liquid is in inverse proportion to the liquid temperature. As the fuel solution parameters in supply line are maintained higher than parameters in the combustion chamber at injection in addition to hydrodynamic breaking of fuel stream by injector the gas dissolved in the fuel solution violently escapes from the liquid thus providing additional atomization of the fuel to more finest aerosol as well as even distribution over the volume of the combustion chamber. The faster evaporation on superfine fuel microdroplets at high temperature present in the combustion chamber provides speedy propagation of the flame front. This way faster and more efficiently burnt fuel delivers more energy at optimal piston and crankshaft position. As a result it takes less fuel to produce the same amount of power, as well as provides a reduction of emissions.

Since the main fuel pump 2 delivers more fuel than the internal combustion engine can consume to produce useful power recirculation lines are provided for returning excess fuel. Recirculation fuel solution flows from common rail is cooled down to 50° C. in cooler 6 and then merged with 1 first stage of the main fuel pump 2 in the jet pump 15: Recirculation fuel solution from the common rail having higher pressure is guided to the nozzle of the jet pump 15; the ejected flow creates low pressure in the mixing chamber and recirculation flow from first stage of the main fuel pump 2 is sucked into the mixing chamber of the jet pump thus providing lower pressure at the drainage port of the main fuel pump and better conditions for gas separation.

Three-way valves 14 and 16 are used to switch between conditioned mode and base mode of engine operation. In conditioned mode operation the mixed recirculation fuel solution flow from jet pump 15 is guided to the recirculation inlet of the absorber. In base mode both valve are set to initial position and recirculation flow from jet pump is guided to the fuel tank 3.

Figure 2:
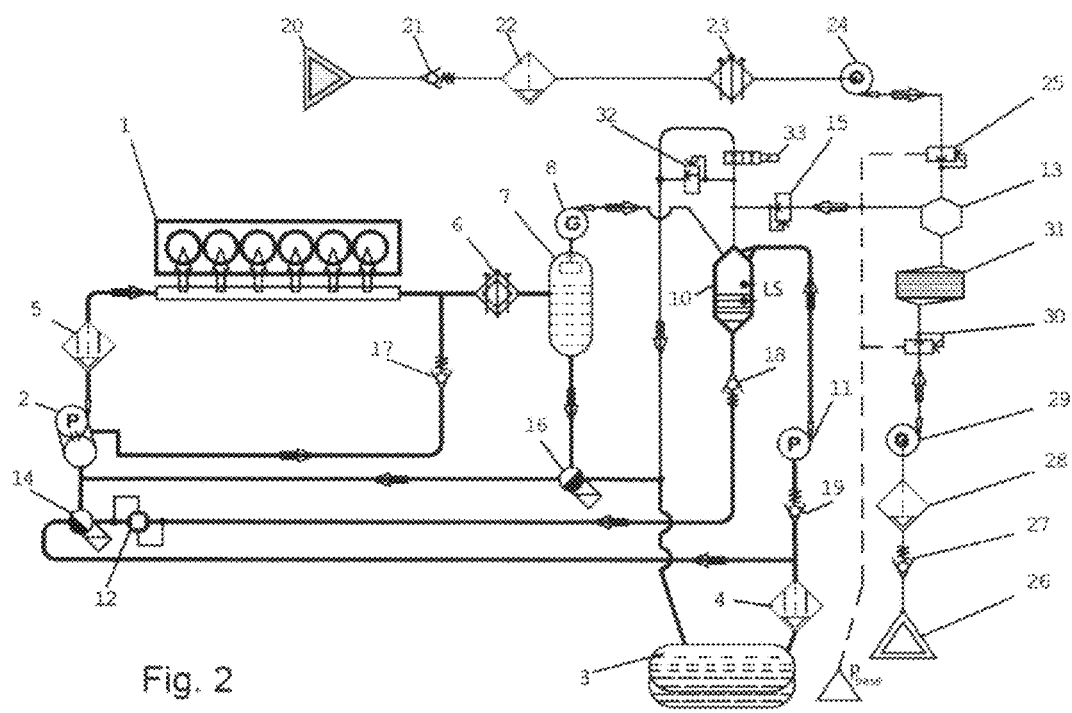
FIG. 2 shows another embodiment of the invention for internal combustion engines having common rail injection system.

In another embodiment (FIG. 2) a gas separator can be provided in recirculation line for removing free gas/fuel vapor phase from recirculation fuel solution flow. The recirculation flow is cooled, preferably, to 50° C. in a cooler 6 and is then guided to the gas separator 7. The liquid fuel solution from gas separator is fed to the inlet of main fuel pump 2 and separated free gas/fuel vapor is guided to the gas port of the absorber 10 using a low pressure compressor 8.

Figure 3:
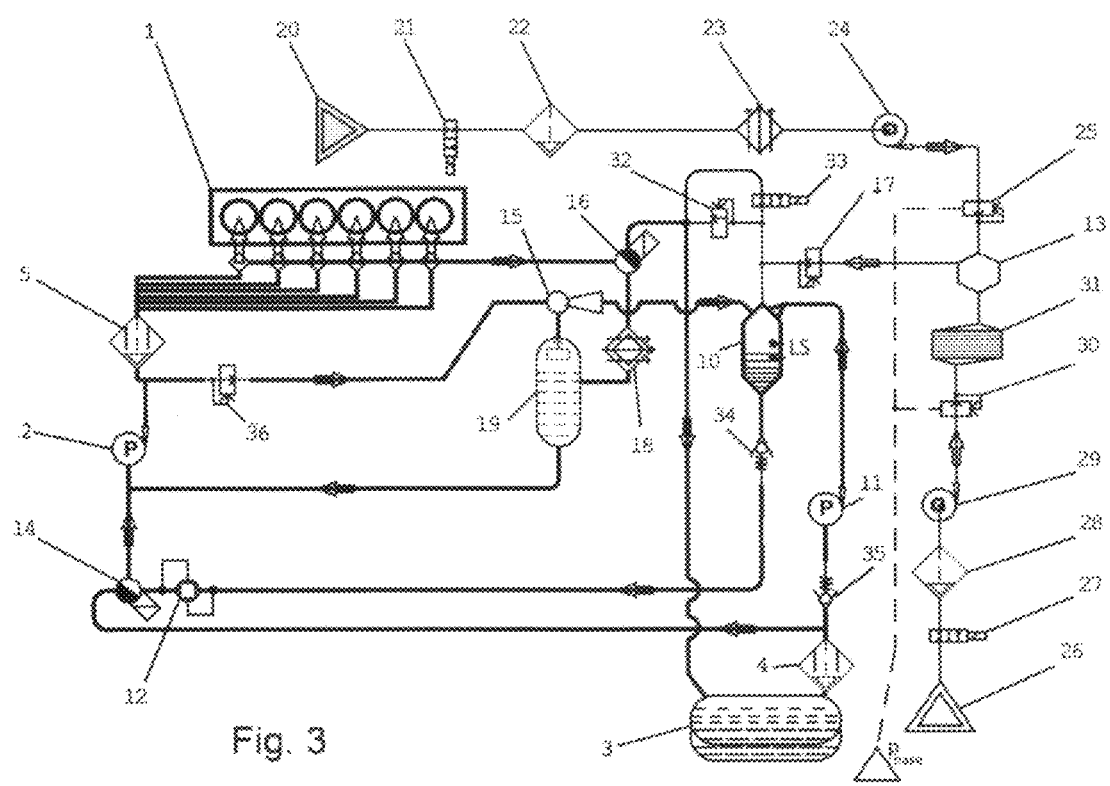
FIG. 3 shows an embodiment of the invention for diesel engines having fuel supply system with fuel distribution pump.

FIG. 3 shows a preferred embodiment for an internal combustion engine having one-stage main fuel pump 2 and distributed unit injectors 1. In conditioned mode operation the recirculation flow from unit injectors 1 contains high concentration of dissolved gasses so it is guided back to the inlet of the main fuel pump. But passing through a cylinder head it contains some free gas/fuel vapor that should be separated from the recirculation flow as it may damage the unit injectors. The recirculation flow is cooled preferably to 50° C. in a cooler 18 and free gas/fuel vapor is separated in a gas separator 19. A jet pump 15 is used to remove separated free gas/fuel vapor from the gas separator 19. To provide operation of the jet pump 15 some fuel after the main fuel pump 2 is guided to the nozzle of the jet pump 15 and the low pressure created by the ejected flow sucks the separated free gas/fuel vapor. The mixed flow from the jet pump is guided to the absorber 10. To keep the pressure at the inlet of unit injectors 1 at required level the pressure regulator 36 is used.

To shut the engine off or at idle operation the fuel supply should be switched to the base mode using three-way valves 14 and 16 and shutting out the fuel supply to the absorber 10.

Before parking the vehicle for a long period of time the cylinder head and the fuel supply should be flushed from conditioned fuel by operating the engine on the base unconditioned fuel for about 30-90 seconds.

The present invention is not to be construed as limited to the forms shown which are to be considered illustrative rather than restrictive.

The invention claimed is:

1. A system for conditioning liquid fuel and directing conditioned fuel solution to an internal combustion engine, said system including; an absorber with a fuel inlet port for intake of fresh fuel from a fuel tank and inlet port for intake return fuel solution flows from a common rail and injectors of said engine and main fuel pump, a gas inlet port for intake of gas for absorption into said fuel forming the conditioned fuel solution, and fuel outlet port for discharge of said fuel solution from said absorber to said engine and a closed circuit recirculation comprising return lines to recycle unused conditioned fuel solution from the main fuel pump and common rail and injectors after injection; wherein joint return flow from common rail and injectors of said engine is cooled and then joint return flows from said engine and main fuel pump are merged in a jet pump, and a common return flow is guided to the absorber.

2. The system as defined in claim 1, further including a solution activator for transferring conditioned fuel solution to a boundary saturated gas/fuel condition in order to reduce sorption links between liquid fuel and gas molecules preventing appearing of free gas bubbles, thereby to prepare said fuel solution for burst gas desorption upon injection into a combustion chamber.

3. The system of claim 1, wherein the gas to be dissolved in the liquid fuel is a mixture of exhaust gas and oxygen-enriched air having enhanced oxygen content of up to 35%.

4. The system as defined in claim 1, further including means for controlling the fuel supply and engine operation in three operational modes, including:
(a) a first mode operational with base unconditioned fuel supply at cold start and idle of said engine;
(b) a second mode operational with conditioned fuel supply at normal engine operation under load;
(c) a third mode of fuel supply for system purge with base unconditioned fuel at engine shut-down for storage;
wherein said conditioned fuel supply is shut off, unconditioned fuel is guided to said inlet port of the main fuel pump, and gas from said absorber is vented to the fuel tank.

5. A system for conditioning liquid fuel and directing conditioned fuel to an internal combustion engine, said system including; an absorber with a fuel inlet port for intake of fresh fuel from a fuel tank and inlet port for intake return fuel solution flows from a common rail and injectors of said engine and main fuel pump, a gas inlet port for intake of gas for absorption into said fuel, and fuel outlet port for discharge of said fuel from said absorber to said engine and a closed circuit recirculation to recycle unused conditioned fuel solution from the main fuel pump and common rail and injectors after injection; wherein the closed circuit recirculation comprises means for mixing joint return flows from common rail and injectors of said engine and return flow from main fuel pump; means for cooling the common return flow; means for collecting and separating free gas/fuel vapors from common return flow and guiding the separated free gas/fuel vapors to the absorber, and means for mixing a common return flow without free gas bubbles with fresh activated fuel solution from absorber and guiding to the inlet port of the main fuel pump.

6. The system as defined in claim 5, further including a solution activator for transferring conditioned fuel solution to a boundary saturated gas/fuel condition in order to reduce sorption links between liquid fuel and gas molecules preventing appearing of free gas bubbles, thereby to prepare said fuel solution for burst gas desorption upon injection into a combustion chamber.

7. The system of claim 5, wherein the gas to be dissolved in the liquid fuel is a mixture of exhaust gas and oxygen-enriched air having enhanced oxygen content of up to 35%.

8. The system as defined in claim 5, further including means for controlling the fuel supply and engine operation in three operational modes, including:
(a) a first mode operational with base unconditioned fuel supply at cold start and idle of said engine;
(b) a second mode operational with conditioned fuel supply at normal engine operation under load;
(c) a third mode of fuel supply for system purge with base unconditioned fuel at engine shut-down for storage;
wherein said conditioned fuel supply is shut off, unconditioned fuel is guided to said inlet port of the main fuel pump, and gas from said absorber is vented to the fuel tank.

9. A system for conditioning liquid fuel and directing conditioned fuel to an internal combustion engine, said system including; an absorber with a fuel inlet port for intake of fresh fuel from a fuel tank and inlet port for intake return fuel solution flow from unit injectors of said engine, a gas inlet port for intake of gas for absorption into said fuel, and fuel outlet port for discharge of said fuel from said absorber to said engine and a closed circuit recirculation to recycle unused conditioned fuel solution from unit injectors after injection, wherein the closed circuit recirculation comprises means for cooling the return flow; means for collecting and separating free gas/fuel vapors from the return flow; means for guiding the separated free gas/fuel vapors to the absorber; and means for mixing the return flow without free gas bubbles with fresh activated fuel solution from absorber and guided to the inlet port of the main fuel pump.

10. The system according to claim 9, wherein the means for guiding the separated free gas/fuel vapors include a jet pump; a line for directing a part of the fuel solution after the main fuel pump and before the fuel filter to a nozzle of the jet pump; lines for directing separated free gas/fuel vapors to a mixing chamber of the jet pump and further to the absorber; a pressure regulator to keep the fuel solution pressure at the inlet of the fuel filter at predetermine level.

11. The system as defined in claim 9, further including a solution activator for transferring conditioned fuel solution to a boundary saturated gas/fuel condition in order to reduce sorption links between liquid fuel and gas molecules preventing appearing of free gas bubbles, thereby to prepare said fuel solution for burst gas desorption upon injection into a combustion chamber.

12. The system of claim 9, wherein the gas to be dissolved in the liquid fuel is a mixture of exhaust gas and oxygen-enriched air having enhanced oxygen content of up to 35%.

13. The system as defined in claim 9, further including means for controlling the fuel supply and engine operation in three operational modes, including:
 (a) a first mode operational with base unconditioned fuel supply at cold start and idle of said engine;
 (b) a second mode operational with conditioned fuel supply at normal engine operation under load;
 (c) a third mode of fuel supply for system purge with base unconditioned fuel at engine shut-down for storage;
  wherein said conditioned fuel supply is shut off, unconditioned fuel is guided to said inlet port of the main fuel pump, and gas from said absorber is vented to the fuel tank.

* * * * *